United States Patent [19]

Smallfoot

[11] Patent Number: 5,005,723
[45] Date of Patent: Apr. 9, 1991

[54] LOCKING SPOUT CLOSURE CAP

[76] Inventor: Lambert L. Smallfoot, 4132 Briarcliff, Des Moines, Iowa 50317

[21] Appl. No.: 321,587

[22] Filed: Mar. 10, 1989

[51] Int. Cl.$^5$ .............................................. B65D 55/14
[52] U.S. Cl. ........................... 220/210; 220/DIG. 33; 70/165; 70/223
[58] Field of Search .......... 220/210, 86 AT, DIG. 33; 70/158, 159, 160, 161, 162, 163, 164, 165, 166, 167, 168, 169, 170, 171, 172, 173, 221, 223

[56] References Cited

U.S. PATENT DOCUMENTS

| | | | |
|---|---|---|---|
| 2,355,888 | 8/1944 | Nusbaum | 70/171 X |
| 3,063,282 | 11/1962 | Aytes | 70/163 |
| 3,477,607 | 11/1969 | Fuzzell et al. | 220/210 |
| 3,759,075 | 9/1973 | Lipschutz | 70/159 |
| 3,893,313 | 7/1975 | Kobayashi | 70/169 X |
| 3,901,407 | 8/1975 | Mitchell et al. | 70/169 X |
| 4,143,530 | 3/1979 | Murtezov et al. | 70/165 |
| 4,231,485 | 11/1980 | Aimar | 220/210 |
| 4,280,346 | 7/1981 | Evans | 70/165 |
| 4,299,102 | 11/1981 | Aro | 70/165 |
| 4,342,208 | 8/1982 | Evans | 70/165 |
| 4,362,035 | 12/1982 | Vitale | 70/165 |
| 4,377,243 | 3/1983 | Shaw et al. | 220/210 |
| 4,453,388 | 6/1984 | Baker et al. | 70/165 |
| 4,794,768 | 1/1989 | Moser et al. | 70/165 |

FOREIGN PATENT DOCUMENTS

| | | | |
|---|---|---|---|
| 2904777 | 8/1979 | Fed. Rep. of Germany | 70/165 |
| 0292884 | 11/1953 | Switzerland | 70/163 |
| 1404415 | 6/1988 | U.S.S.R. | 220/210 |

Primary Examiner—Stephen P. Garbe
Assistant Examiner—Nova Stucker
Attorney, Agent, or Firm—Leon Gilden

[57] ABSTRACT

A locking spout closure cap is set forth provided with a threaded cylindrical lowermost portion with a cap mounted about the uppermost portion. Underlying the cap are plural pairs of combination dials provided with operative engagement with downwardly extending positioning legs. The combination dials are mounted about posts with an alignment plate operably secured to the posts wherein each of the combination dials must be rotated into alignment to position each respective positioning leg in overlying engagement with a predetermined orientation of latch openings secured to a combination plate to enable operative engagement with the uppermost portion of the combination plate to enable securement or removal of the cap relative to an associated spout.

9 Claims, 4 Drawing Sheets

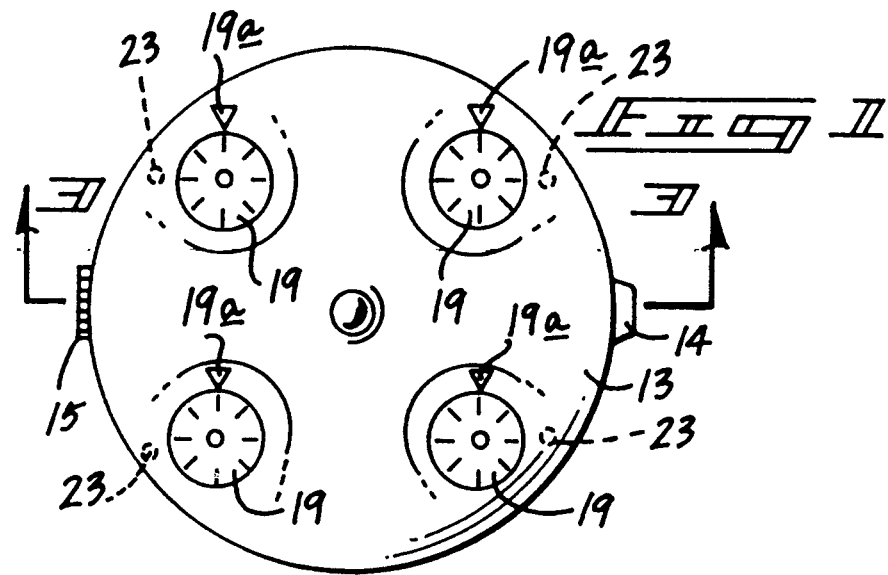
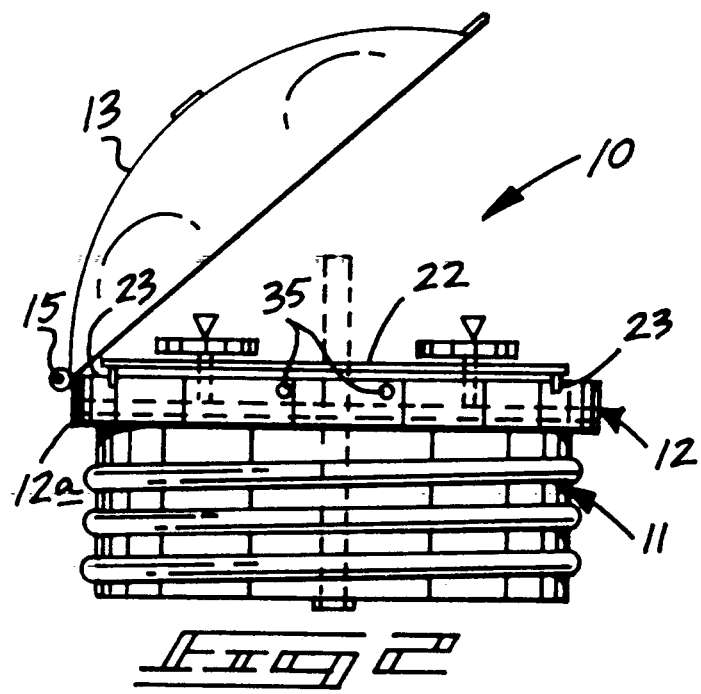

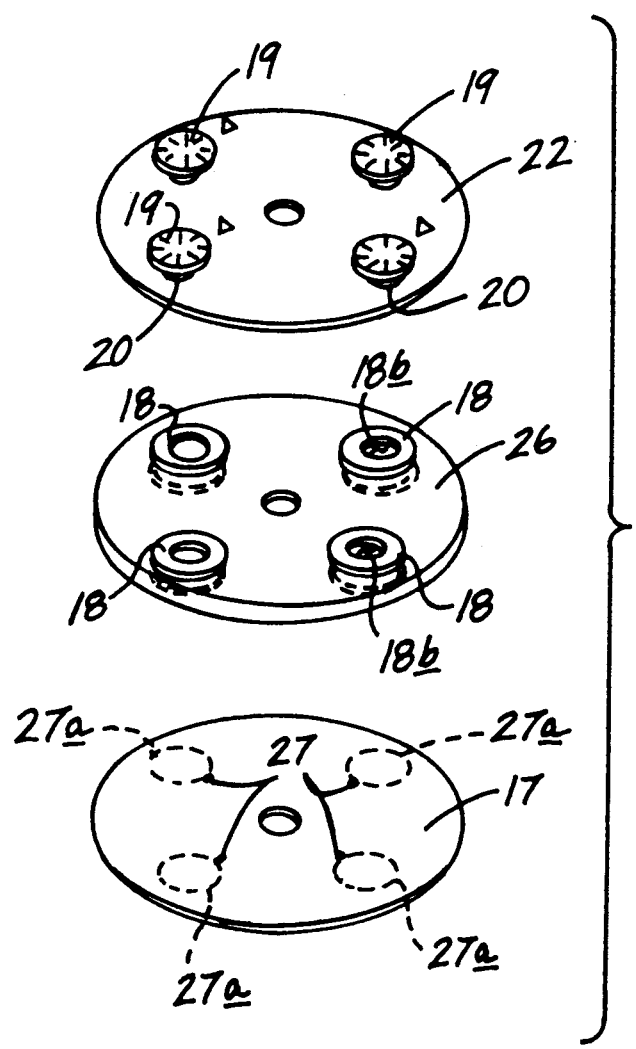

LOCKING SPOUT CLOSURE CAP

BACKGROUND OF THE INVENTION

1. Field of the Invention

The field of invention relates to locking caps, and more particularly pertains to a new and improved locking spout closure cap wherein the same includes plural pairs of combination members that must be oriented in a predetermined alignment relative to a combination plate.

2. Description of the Prior Art

The use of various locking spout caps have been provided in the prior art. The prior art has heretofore utilized relatively complex locking cap arrangements to enable the securement of a cap relative to a spout. The instant invention attempts to overcome the prior devices by setting forth a straight forward mechanism minimizing breakage of the cap and area thereof due to a limited number of parts therewithin. An example of the prior art is set forth in U.S. Pat. No. 3,477,607 to Fuzzell, et al., wherein a manually lockable spout closure cap provided with an outer cap preventing direct grasping of an inner cap, wherein the outer cap is reciprocatably movable relative to the inner cap to enable engagement of projections which in turn engage the inner cap and thereby enable rotation of the inner cap by rotation of the outer cap. Conversely, disengagement of the projections releases an inter-relationship between the outer and inner cap. The patent is of interest relative to the orientation of the outer cap relative to the inner cap and the selective engagement of the two caps together.

U.S. Pat. No. 4,231,485 to Aimar sets forth a vehicular filler cap closure wherein engagement of two members coaxially aligned utilizing a tumbler and key lock arrangement enables selective securement of the cap relative to a gas tank arrangement.

U.S. Pat. No. 4,342,208 to Evans sets forth a further example of utilizing an axially aligned tumbler and key lock arrangement in association with a locking gas cap to enable selective securement of the gas cap relative to a filler spout. The Evans patent is an example of a relatively complex and interrelated organization relative to the instant invention setting forth a streamlined and effective means of locking a filler cap organization.

U.S. Pat. No. 4,453,388 to Baker sets forth a locking gas cap arrangement utilizing a key and tumbler organization to enable selective latching of an outer hand-grip shell relative to an inner spout securement portion.

U.S. Pat. No. 4,362,035 to Vitale utilizes a shield rotatably mounted to a threaded element of the closure, wherein the shield may be removed from the threaded element or connected to the threaded element upon utilization of the coaxially oriented key-tumbler arrangement. Without such engagement, the threaded element may not be rotated for disengagement from the conduit within which the threaded portion is engaged and wherein the gas cap is further provided with protection against unauthorized disengagement from its associated conduit by binding the shield to the threaded element with an adhesive and rotating the shield thereover.

As such, it may be appreciated that there continues to be a need for a new and improved locking spout closure cap wherein the same addresses both the problems of ease of use and effectiveness of construction, and in this respect, the present invention substantially fulfills this need.

SUMMARY OF THE INVENTION

In view of the foregoing disadvantages inherent in the known types of locking spout closure caps now present in the prior art, the present invention provides a locking spout closure cap wherein the same may be readily engaged within a filler spout and provided with an anti-tampering upper portion selectively engageable with a threaded lower portion for securement of the cap relative to a spout of an associated gasoline container. As such, the general purpose of the present invention, which will be described subsequently in greater detail, is to provide a new and improved locking spout closure cap which has all the advantages of the prior art locking gas cap devices and none of the disadvantages.

To attain this, the present invention comprises a cylindrical bottom portion engageable with a spout of a fluid container with an upper top portion rotatably mounted to the bottom portion. The top portion includes a lid overlying a combination plate provided with a plurality of displaced openings to receive downwardly extending combination legs to engage a first deck directed through a second deck to engage the combination plate wherein the combination plate is fixedly secured to the bottom portion to enable an interlatching of the top portion relative to the bottom portion and enable torque transmission between the two portions. The combination legs are rotatably mounted within circular flanges which are in turn rotatably mounted to indicator dials overlying an alignment plate wherein each of the dials must be properly oriented to enable downwardly directing each of the respective combination legs to enable the alignment plate to be directed downwardly and enable all of the combination legs to be directed through its respective opening within the combination plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved locking spout closure cap which has all the advantages of the prior art locking spout closure caps and none of the disadvantages.

It is another object of the present invention to provide a new and improved locking spout closure cap which may be easily and efficiently manufactured and marketed.

It is a further object of the present invention to provide a new and improved locking spout closure cap which is of a durable and reliable construction.

An even further object of the present invention is to provide a new and improved locking spout closure cap which is susceptible of a low cost of manufacture with regard to both materials and labor, and which accordingly is then susceptible of low prices of sale to the consuming public, thereby making such locking spout closure caps economically available to the buying public.

Still yet another object of the present invention is to provide a new and improved locking spout closure cap which provides in the apparatuses and methods of the prior art some of the advantages thereof, while simultaneously overcoming some of the disadvantages normally associated therewith.

Still another object of the present invention is to provide a new and improved locking spout closure cap wherein the same utilizes a plurality of rotatably mounted combination dials that must be properly oriented relative to an associated indicator to enable a depressing of each of the combination dials downwardly to enable engagement of a combination plate and the engagement of a top portion relative to a bottom portion to effect torque transmission between the two portions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the instant invention.

FIG. 2 is an orthographic view, taken in elevation, of the instant invention.

FIG. 5 is an isometric exploded view of the alignment plate, the second deck, and the combination plate.

DESCRIPTION OF THE PREFERRED EMBODIMENT

Figure 3:
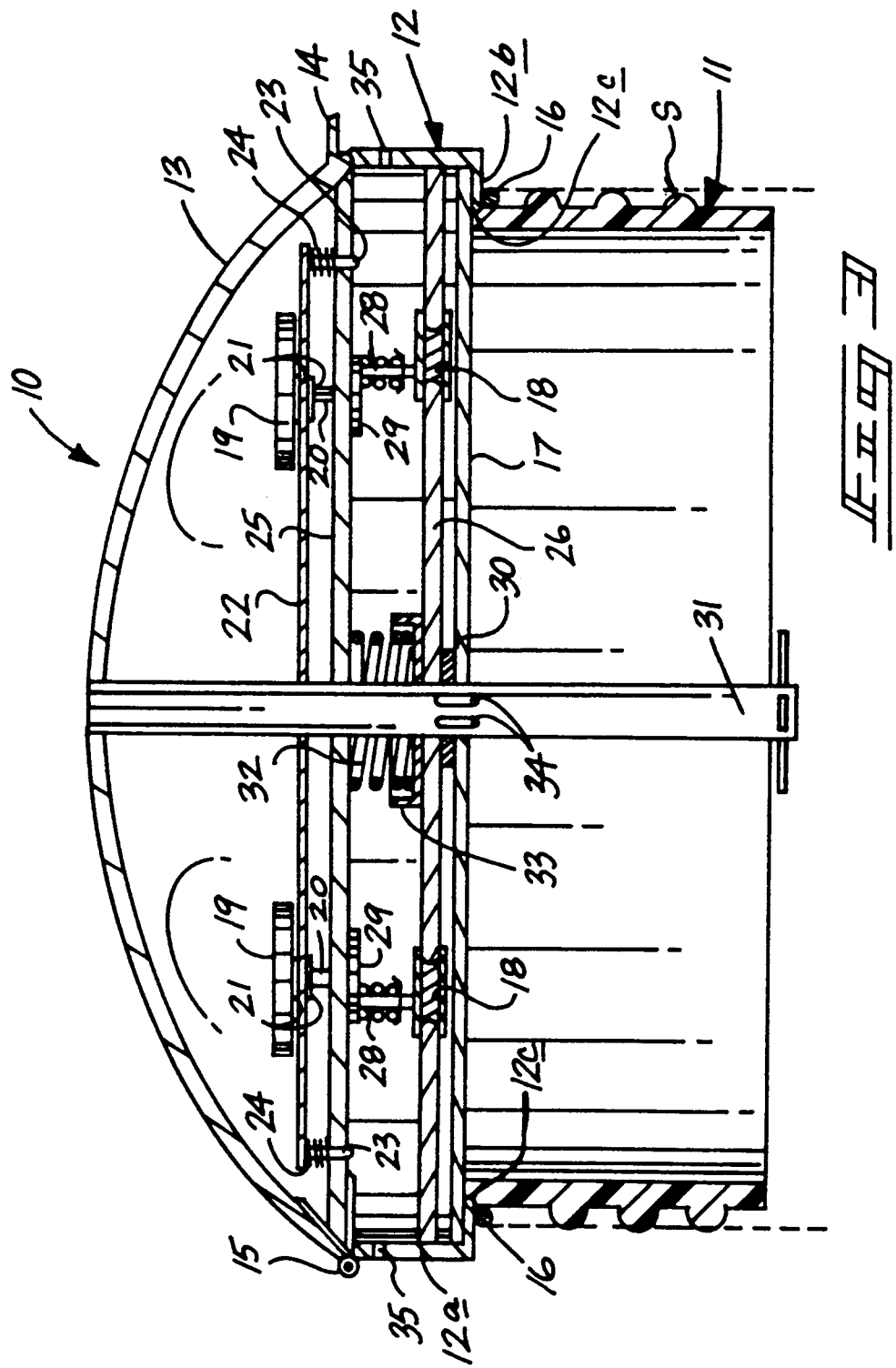
FIG. 3 is an orthographic view taken along the lines 3—3 of FIG. 1 in the direction indicated by the arrows.
Figure 4:
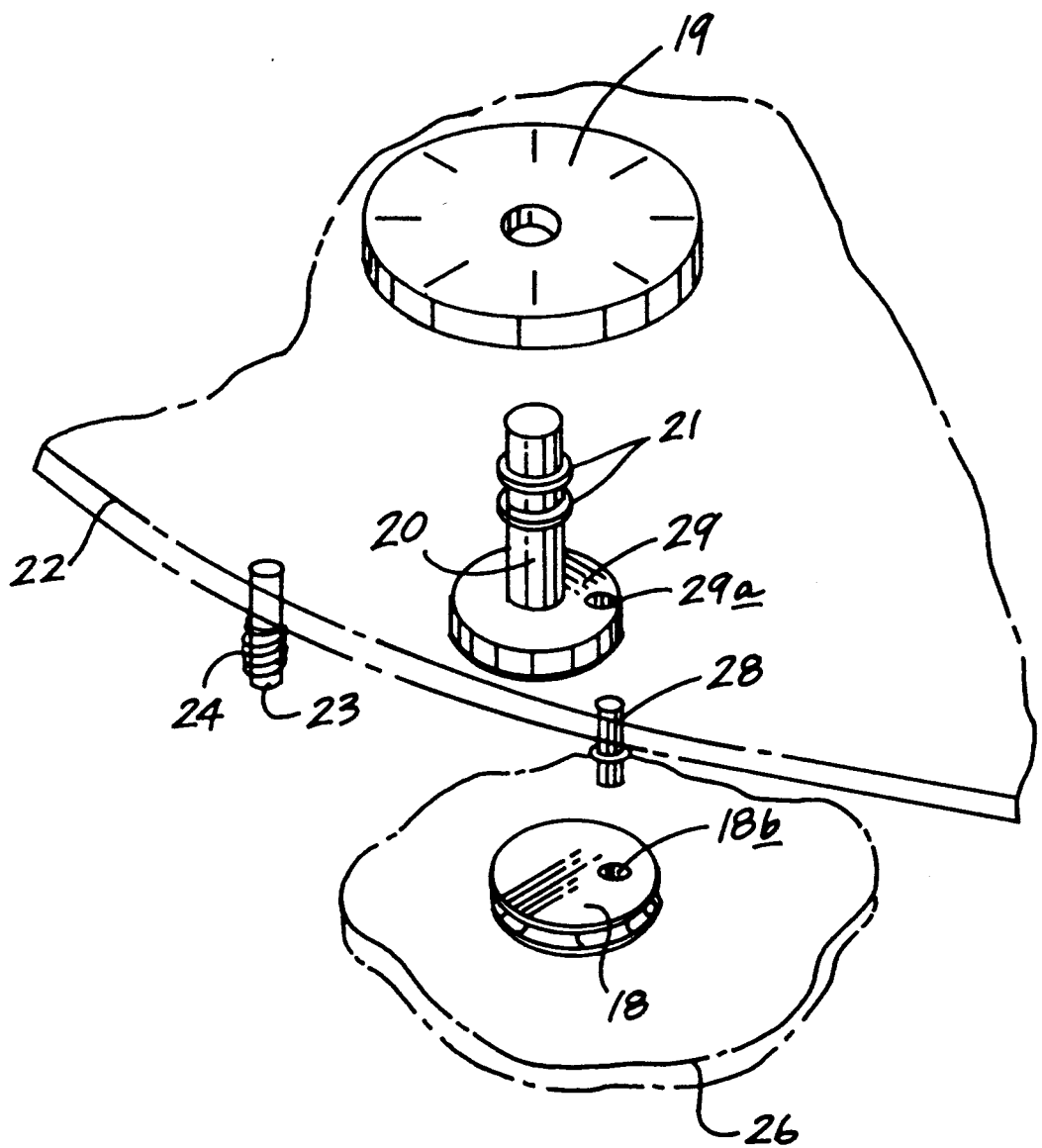
FIG. 4 is an isometric illustration of a respective indicator dial arrangement, as utilized by the instant invention.

With reference now to the drawings, and in particular to FIGS. 1 to 5 thereof, a new and improved locking spout closure cap embodying the principles and concepts of the present invention and generally designated by the reference numeral 10 will be described.

More specifically, it will be noted that the locking spout closure cap apparatus 10 essentially comprises a threaded cylindrical bottom portion 11 with a coaxially aligned overlying top portion 12 is rotatably mounted to the bottom portion 11. The top portion 12 is provided with a cylindrical skirt 12a coaxially aligned with the bottom portion 11 with an inwardly directed annular flange 12b orthogonally oriented relative to the cylindrical skirt 12a to be directed within an annular groove to receive the annular flange 12b. A lid 13 is secured to the skirt 12a with a projecting flange 14 oriented at a forwardmost portion of the lid with a diametrically opposed spring hinge 15 secured between the lid 11 and the skirt 12a to normally bias the lid 13 in a closed orientation relative to the skirt 12a. A continuous annular sealing "O" ring 16 is positioned underlying the annular flange 12b to sealingly secure the apparatus 10 relative to a spout "S", as illustrated in FIG. 3.

An annular combination plate 17 is fixedly secured to the bottom portion 11 positioned adjacent the annular flange 12b of the cylindrical skirt 12a. The combination plate 17 is provided with a preselected array of combination openings 27 wherein, as illustrated in FIG. 5, are formed radially about a central axis defining a combination circle 27a which are coaxially aligned with respective combination dials 19, to be discussed in more detail below.

Overlying the combination plate 17 is a second deck 26 spaced underlying a first deck 25. The second deck 26 is formed to rotatably receive a series of combination disks 18, each formed with "C" shaped annular edges 18a to be rotatably captured within the second deck 26. Each combination disk 18 is provided with an axially offset aperture 18b axially offset to define a circle equal to that of the combination circle 27a whereupon appropriate rotation of each respective combination disk 18 will align an associated combination leg 28 relative to the aforenoted combination opening 27. The combination leg 28 is slidably and rotatably mounted within the aperture 18b and is fixedly secured to an overlying dial flange 29. The dial flange 29 is provided with a dial aperture 29a fixedly receiving the combination leg 28. The dial flange 29 is formed with a dial post 20 directed upwardly through a first deck 25 fixedly secured to the skirt 12a and through an alignment plate 22 terminating in a dial 19 alignable with an indicator 19a. Each dial post as illustrated in FIG. 1 includes spaced annular flanges 21 capturing the alignment plate 22 therebetween. Upon rotation of each dial 19 to an appropriate preset orientation relative to the indicator 19a corresponding to a predetermined combination dependent upon the positioning of the respective combination opening 17, each combination leg will then be aligned with its respective combination opening 27.

The alignment plate 22 is provided with a series of positioning legs 23 slidably received through complementary openings within the first deck 25 and normally biased upwardly by springs 24. When the combination legs are offset relative to the associated combination openings 27, the alignment plate 22 may not be directed downwardly against the first deck 25 until all of the combination legs 28 are appropriately aligned with a respective combination opening 27 whereupon the dials 19, the associated dial posts 20, may be directed downwardly along with the alignment plate 22 against the first deck 25 whereupon the combination legs will be engaged with the combination openings 27 and thereby enable an interlocking of the top portion 12 relative to the bottom portion 11. As set forth above, the combination plate 17 is fixedly secured to the bottom portion 11. A bushing 30 maintains a spacing of the second deck 26 relative to the combination plate 17 and further enhances rotation of the top portion 12 relative to the bottom portion 11 when the combination legs 28 are disengaged from the respective combination openings 27.

A vent rod 31 is provided with a spring cup 33 to capture a vent spring 32 between the spring cup 33 and the underlying surface of the first deck 25. Upon appropriate pressure being developed within the container associated with the spout "S", the vent rod 31 will be directed upwardly against the pressure of the vent spring 32 whereupon grooves 34 formed within the surface of the vent rod 31 will be directed upwardly through the second deck 26 to enable venting of pressure through the grooves 34 and enable such pressure to escape outwardly through vent openings 35 formed orthogonally through the skirt 12a.

As to the manner of usage and operation of the instant invention, the same should be apparent from the above description, and acccordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A locking closure cap comprising, in combination, a cylindrical bottom portion and a coaxially aligned top portion rotatably secured to said bottom portion, and an annular combination plate fixedly mounted to the bottom portion, and latch means for selective securement of said top portion to said bottom portion to enable selective torque transmission between said top portion and said bottom portion wherein said latch means is interengageable between said top portion and said bottom portion, and wherein said latch means includes a plurality of combination legs reciprocatably mounted within said top portion to engage openings formed in the combination plate wherein the combination plate is integrally secured to said bottom portion to secure said top portion to said bottom portion, and wherein said top portion includes a cylindrical skirt formed with a hinged top mounted to said skirt, and a first deck secured integrally between and orthogonally to said skirt, and a plurality of combination dials each including a dial post extending downwardly therefrom and slidingly directed through said first deck and the top portion further including an alignment plate positioned about the first deck securing said dial posts together wherein said alignment plate includes a plurality of legs integrally mounted to the alignment plate and slidably received within said first deck.

2. A locking closure cap as set forth in claim 1 wherein each of said dial posts include a rotatable annular flange member secured to a terminal lowermost end of each dial post, and wherein a combination leg of said plurality of combination legs are secured to each annular flange member axially offset from said flange member.

3. A locking closure cap as set forth in claim 2 wherein each of said combination legs are slidably received within a combination disk, and each combination disk of each combination leg is rotatably mounted within a second deck integrally secured to said skirt underlying said first deck and spaced above said combination plate.

4. A locking closure cap as set forth in claim 3 wherein each combination disk receives each combination leg axially offset from each combination disk.

5. A locking closure cap as set forth in claim 4 wherein each combination disk includes a "C" shaped peripheral surface to capture said second deck within said surface.

6. A locking closure cap as set forth in claim 5 wherein the combination leg directed through each combination disc defines a combination circle wherein each opening to receive each combination leg is defined within said combination circle.

7. A locking closure cap as set forth in claim 6 wherein each leg of said plurality of spaced legs of the positioning plate includes a spring formed about each leg and oriented between the positioning plate and an upper surface of the first deck to normally bias the positioning plate outwardly of the first deck.

8. A locking closure cap as set forth in claim 7 wherein the lid of the top portion includes a spring hinge formed at a junction of the skirt and the lid to normally bias the lid in a closed orientation relative to the skirt.

9. A locking closure cap as set forth in claim 8 further including a vent rod formed with a series of grooves about a surface of the rod wherein the vent rod is reciprocatably mounted axially through the combination plate, the first deck, the second deck, and the positioning plate, and wherein the vent rod is reciprocatable from a first lowered position to a second raised position to enable the grooves to vent trapped gases and direct such gases through vent openings formed orthogonally through the skirt.

* * * * *